INVENTORS
ELWOOD L. JEROME &
GENE C. BURNS

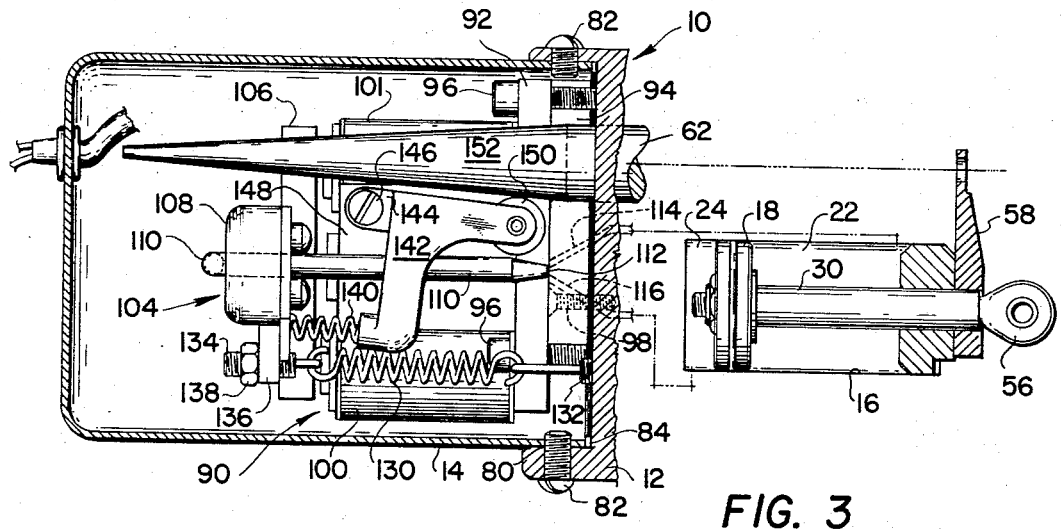
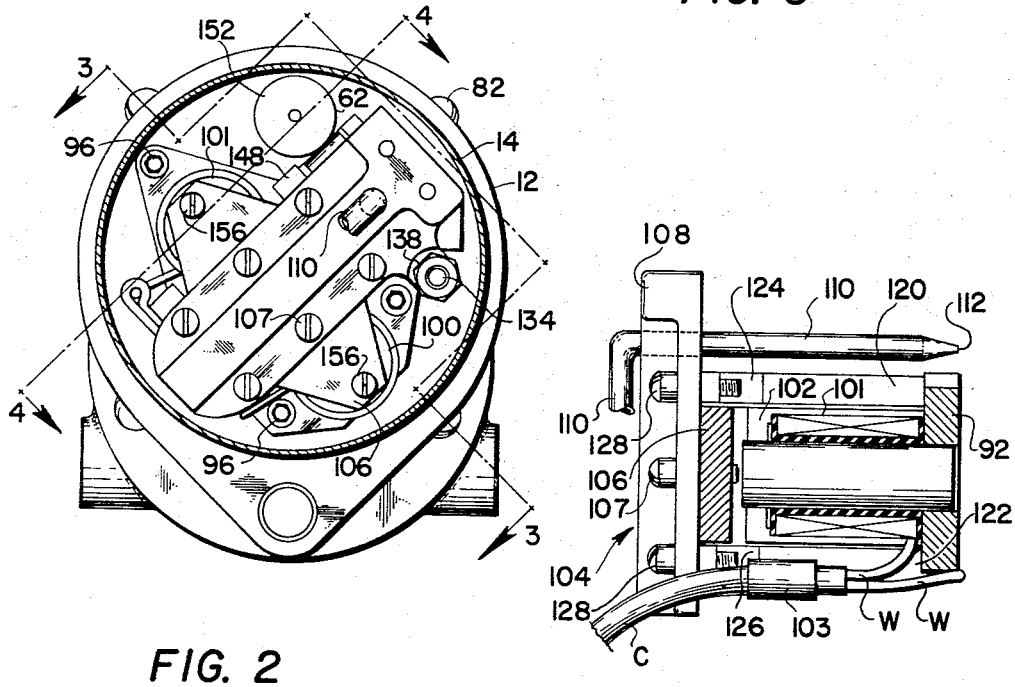

United States Patent Office 3,338,136
Patented Aug. 29, 1967

3,338,136
SERVO ACTUATOR
Elwood L. Jerome, Manhattan Beach, and Gene C. Burns, Palos Verdes Peninsula, Calif., assignors to Pneumo Dynamics Corporation, Cleveland, Ohio
Filed Sept. 18, 1964, Ser. No. 397,421
10 Claims. (Cl. 91—3)

The present invention relates in general to control apparatus and more particularly, as indicated, to a servo actuator which controls fluid flow to a chamber in which is mounted a displaceable piston member operatively connected to an external mechanism for operating the same.

An object of the present invention is to provide a servo actuator in which movement of the displaceable piston member functions to maintain the same in its new position.

A more specific object of the present invention is to provide a servo actuator in which movement of the displaceable piston is operatively connected to a novel tapered feedback rod by means of which the fluid supply means can be repositioned to maintain the piston in its new position.

A further object of the present invention is to provide a servo actuator which is simply constructed and reliable in use.

These and other objects and advantages of the present invention will become apparent as the following description proceeds.

To the accomplishment of the foregoing and related ends, the invention, then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 2 is a cross-sectional view taken on line 2—2 of FIG. 1;

FIG. 3 is a sectional view taken on line 3—3 of FIG. 2, with certain of the actuator components being shown schematically, and FIG. 4 is a partially fragmentary, sectional view taken on line 4—4 of FIG. 2.

Figure 1:
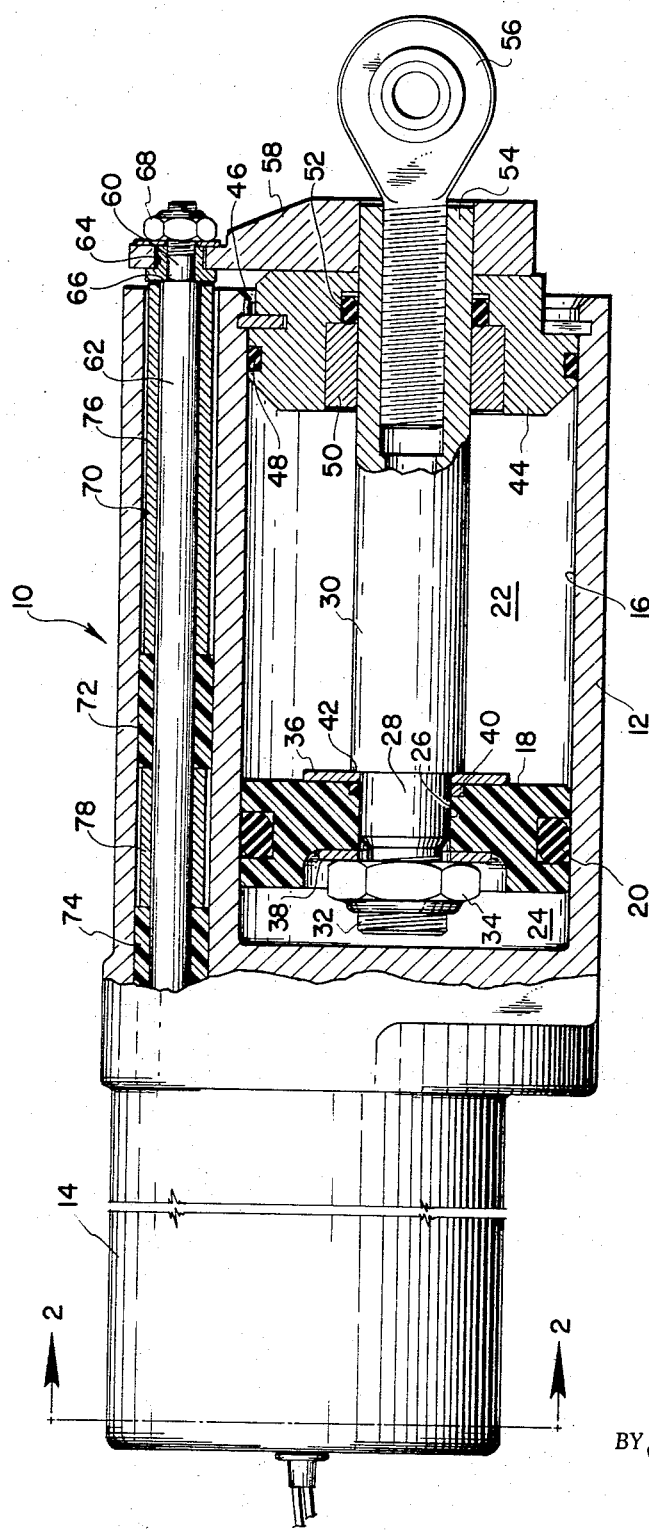
FIG. 1 is a side elevational view, partly broken away and sectioned, of the servo actuator of the present invention.

Referring now in more detail to the drawings, wherein like parts have been indicated by like reference numerals, and initially to FIG. 1, the servo actuator of the present invention is generally indicated at 10 and includes a main housing portion 12 which houses the mechanism controlled by the actuator and a torque motor housing 14 mounted at one end of the housing 12 in a manner to be hereinafter described. The main housing 12 is formed with a relatively large cylindrical chamber 16 in which a displaceable piston 18 is mounted for reciprocating movement, with a sealing ring 20 being provided in the usual manner to seal off the thus formed piston chambers 22 and 24 at opposite sides of the piston 18. Pressurized fluid is adapted to be supplied to the respective piston chambers 22 and 24 relatively adjacent the ends thereof, with the position of the piston being controlled by the respective pressures therein.

The piston 18 is centrally bored as indicated at 26 to receive a reduced diameter portion 28 of a piston rod 30. The adjacent end of the piston rod is provided with threads 32 for receiving nut 34 to mount the piston 18 on the piston rod. Washers 36 and 38 and a sealing ring 40 are provided to complete the piston mounting assembly, with the washer 36 contacting an annular shoulder 42 of the piston rod 30 thus to mount securely the piston 18 when the nut 34 is tightened.

The opposite, outer end of the piston chamber 22 is defined by a packing gland 44 which is longitudinally positioned and retained within the cylindrical chamber 16 by means of a retaining ring 46, with such mounting being sealed by means of sealing ring 48. The packing gland 44 is longitudinally centrally bored to receive the piston rod 30 and is counterbored to receive a sleeve bearing 50 and a sealing ring 52.

The outer end 54 of the piston rod 30 is internally bored to receive the threaded end of a coupler 56 the outer end of which is apertured and adapted to be connected to any suitable device or mechanism for controlling the same. A feedback arm 58 is mounted on the outer end of the piston rod 30 through any suitable means (not shown) such as a pin and set screw arrangement. The piston rod 30 is shown in its innermost position in FIG. 1, with the feedback arm 58 contacting the front face of the packing gland 44. The upper portion of the feedback arm is apertured to receive the reduced end portion 60 of a feedback rod 62 and a spacing sleeve 64, the enlarged portion of which bottoms on an annular shoulder 66 of the feedback rod 62. The feedback arm 58 is retained on the threaded, reduced end of the feedback rod by means of a self-locking nut 68.

The feedback rod 62 is mounted within a cylindrical opening 70 formed in the main housing 12 and is concentrically spaced therein by means of cylindrical bearings 72 and 74. Spacer sleeves 76 and 78 are provided for positioning and spacing the bearings 72 and 74 within the cylindrical opening 70.

In the invention thus far described it will be seen that movement of the piston rod 30 through controlled delivery of pressurized fluid to the piston chambers 22 and 24 will effect corresponding movement of the feedback rod 62 operatively connected to the piston rod 30. By means to be presently described, movement of the feedback rod 62 conditions the fluid supply means, which in the form disclosed comprises a jet pipe, for the re-establishment of equal pressure conditions within the piston chambers 22 and 24 thereby to maintain the piston 18, and thus the piston rod 30 and coupler 56, in its adjusted position.

Referring to FIGS. 2–4, the main housing 12 is formed with an annular recess 80 for receiving the open end of the torque motor housing 14, with the latter being secured in such mounted position through mounting screws commonly designated at 82. An O-ring 84 is provided for sealing such mounting.

A torque motor assembly generally indicated at 90 is mounted within the housing 14. The assembly includes a base plate 92 which is rigidly secured to a receiver plate 94 by means of a plurality of mounting screws commonly designated at 96. The receiver plate 94 in turn is rigidly secured to the main housing 12 by means of a plurality of mounting screws 98 only one of which is visible in FIG. 3. The torque motor assembly further includes coil assemblies 100 and 101 and a permanent magnet 102 all of which are mounted on the base plate 92. The coil assemblies 100 and 101 are adapted to be selectively energized by a suitable electrical source (not shown) through a cable C and lead wires W, FIG. 4, the cable being mounted on a cable clamp 103. The permanent magnet 102 provides polarization of the magnetic circuit and functions to increase the operating force level of the unit.

An armature assembly generally indicated at 104 is operatively connected to the base plate 92 and is adapted to be controlled by the coils 100 and 101. The armature assembly 104 includes an armature 106 mounted by means of screws 107 to a support plate 108, the opposite ends of the armature terminating above the respective coil assemblies 100 and 101. A jet pipe 110 is mounted on said support plate 108 adjacent one end thereof and is adapted to receive fluid under pressure from any suitable source (not shown). In the form shown the leading end of the jet pipe 110 is relatively reduced to provide a discharge opening 112 which is adapted to supply fluid under pressure to receiving openings 114 and 116, FIG. 3, formed in the receiver plate 94. As shown schematically in FIG. 3, the receiving passage 114 communicates with the piston chamber 22 and the receiving passage 116 communicates with the piston chamber 24 whereby fluid in variable proportions can be admitted to such chambers for adjustably positioning the piston 18 mounted therein.

The support plate 108 is operatively connected to the base plate 92 through a pair of flexure members 120 and 122, FIG. 4, which are provided with mounting portions 124 and 126, respectively, which are adapted to receive mounting portions 124 and 126, respectively, which are adapted to receive mounting bolts commonly designated at 128 for securing the flexure members to the support plate 108. The opposite ends of the flexure members are mounted on the base plate 92 by any suitable means. The flexure members 120 and 122 serve to flexibly mount and orient the armature 106 and the support plate 108 on the base plate 92 and permit movement of the armature and the support plate in response to actuation of the coil assemblies 100 and 101 to variably position the jet pipe 110. The flexure members 120 and 122 additionally serve to center the support plate 108 and the armature 106 and thus help to maintain, in the absence of a control signal, the jet pipe 110 in a null position wherein the discharge orifice of the jet pipe is symmetrically located relative to the receiving openings 114 and 116.

A balance spring 130 operatively resiliently connects the support plate to the housing 12, with one end convolution of the balance spring 130 being hooked to a spade bolt 132 mounted in a threaded opening in the main housing 12, and the opposite hooked end of the balance spring being mounted through a similar spade bolt 134 which extends through a threaded opening in an extension 136 of the support plate 108. The balance spring is tensioned in certain operative positions of the supporting plate 108 and functions to bias the same to a position where the jet pipe operatively connected thereto is symmetrically located relative to the passages 114 and 116. The spring 130 can be adjusted by the spade bolt 134 and a nut 138 is provided to retain the spade bolt 134 in such adjusted position.

A helical compression spring 140 is secured at one end to the support plate 108 and at its opposite end to a follower 142. The latter is provided with a lateral projection 144 for pivotally mounting the same by means of a shoulder screw 146 to a fixed block 148 mounted on the base plate 92 of the torque motor assembly. The opposite end of the follower 142 rotatably mounts a roller 150 which resiliently engages, under the bias of spring 140, the tapered end 152 of the feedback rod 62 above described. Spring 140 functions similarly to spring 130 to return the support plate and thus the jet pipe to a null position, as will be presently described.

As above noted, the opposite ends of the armature 106 terminate above the respective coils 100 and 101 and set screws commonly designated at 156 are provided which extend through such opposite ends to a position closely adjacent the coils 100 and 101. The set screws 156 can be adjusted to variably position the same from the coil assemblies 100 and 102 to limit the stroke in either direction of the armature and thus the support plate and jet pipe operatively connected thereto.

Referring now to the operation of the servo actuator of the present invention, the jet pipe 110 is shown in FIG. 3 in a null position, and is maintained therein, in the absence of a control signal, by the flexure members 120 and 122, the compression spring 140 and the balance spring 130. In such null position, the discharge orifice 112 of the jet pipe is symmetrically located relative to the receiving passages 114 and 116 and pressurized fluid entering the jet pipe is thus directed in substantially equal proportions to the receiving passages thereby creating equal pressures therein and in the piston chambers 22 and 24 whereby the piston 18 will remain in its previously adjusted position. When an input signal is delivered to one of the coil assemblies 100 or 101 not just previously energized, the armature 106 and the support plate 108 will be biased toward that coil assembly to which the signal is imparted thereby correspondingly moving the jet pipe 110 to disrupt the symmetrical spacing of the discharge orifice thereof relative to the receiving passages 114 and 116 to create a differential in pressure in such passages and thus in the piston chambers 22 and 24. For example, when the piston 18 is in its FIG. 3 position and an input command signal is imparted to the coil assembly 101, the armature 106 will be biased toward the coil assembly 101 thereby causing the support plate 108 and the jet pipe 110 connected thereto to be rotated clockwise. As a result of such movement, tension will be created in spring 130, the opposite end thereof being fixed relative to the housing 12, and the compressive force in spring 140 will be somewhat relieved. The leading, discharge orifice end of the jet pipe will be moved from a symmetrical position relative to the receiving passages 114 and 116 to a position wherein a major portion of the fluid emanating from the discharge orifice 112 will be directed into the receiving passage 116 and thus into the piston chamber 24. There will thereby be created a differential in pressure in the piston chambers 22 and 24, with the latter being at a relatively higher pressure, whereby the piston 18 will be moved to the right in the cylindrical chamber 16 to operate the external mechanism being controlled by the actuator through the coupler 56.

As the piston 18 moves in the direction indicated, the feedback arm 58 will be moved by the piston rod 30 thereby moving the feedback rod 62 to the right at the same rate of movement of the piston 18. As the feedback rod 62 is thus moved to the right, the roller 150 will engage the moving tapered end portion 152 of the feedback rod thereby further relieving the compressive force in the spring 140. Continued movement of the feedback rod will eventually relieve the compressive force on the spring 140 to a point wherein the tensile force of spring 130 exceeds the combined forces of the compression spring 140 and the force of the input signal acting on the jet pipe at which time the spring 130 biases the support plate 108 and thus jet pipe 110 in a counterclockwise direction to return the same to a null position thereby reestablishing symmetrical spacing of the jet pipe discharge orifice 112 from the receiving passages 114 and 116. Equal pressures are again created in piston chambers 22 and 24 whereby the piston 18 is maintained in its adjusted position.

When a command signal is subsequently imparted to the coil assembly 100, the support plate 108, armature 106 and jet pipe 110 will be rotated counterclockwise, referring to the FIG. 3 showing thereof, whereby a proportionally greater amount of fluid will be directed into receiving passage 114 relative to passage 116. The spring 140 will be compressed by such movement relative to its relieved condition at the end of the previously described movement of the piston 18, and the tension in spring 130 will be relieved. The fluid pressure will consequently become greater in piston chamber 22 relative to chamber 24 and the piston 18 and rod 30 will be moved to the left. The tapered feedback rod 62 will correspondingly travel to the left whereby the follower 142 will be pivoted clockwise about its pivot 146 due to the contact of the roller 150 with the increasing diameter tapered end 152 of the feedback rod. The spring 140 will be compressed as a result of such pivotal movement of the follower 142 and the compressive force will gradually build up in the spring until, relatively near the end of the piston stroke, such force will exceed the force on the support plate 108 from the input signal to the coil assembly 100, and the spring 140 will then bias the support plate 108, armature 106 and jet pipe 110 in a clockwise direction to re-establish symmetrical spacing of the jet pipe discharge orifice 112 from the receiving passages 114 and 116. Equal fluid pressures will be recreated in the piston chambers 22 and 24 and the piston 18 will be retained in its new position.

The servo actuator of the present invention is preferably pneumatically operated, but it will be apparent to those skilled in the art that the principles of the invention would be applicable to hydraulic operations as well, and the term "fluid" as used hereinabove and in the appended claims is intended to include both forms of operation.

It will thus be seen that the servo actuator of the present invention is mechanically simple and quickly responsive to the imparting of an input signal to one of the coil assemblies 100 or 101. The resulting deflection of the jet pipe and pressure unbalance in the piston chambers 22 and 24 effects movement of the piston 18, thereby providing movement of the external mechanism controlled by the actuator. The movement of the piston automatically effects, through the tapered feedback rod operatively connected thereto, a feeding back of the jet pipe to a null position to retain the piston in its new position.

Other modes of applying the principle of the invention may be employed, change being made as regards the details described, provided the features stated in any of the following claims or the equivalent of such be employed.

We therefore particularly point out and distinctly claim as our invention:

1. A servo actuator comprising housing means, a cylindrical chamber formed in said housing, piston means mounted for reciprocation within said cylindrical chamber to form variable volume chambers at opposite sides of said piston, an armature assembly flexibly mounted in said housing, said armature assembly including an armature and a jet pipe movable with said armature assembly, a pair of receiving passages in said housing adjacent the discharge end of said jet pipe for directing proportionally variable amounts of fluid under pressure to said piston chambers for controlling the position of said piston, said jet pipe when in a null position having its discharge end symmetrically located relative to said receiving passages for supplying substantially equal quantities of fluid thereto, means providing an electrical signal to bias said armature for variably positioning said jet pipe to deliver disproportionate amounts of fluid to said receiving passages, a feedback rod mounted within said housing and operatively connected to said piston for movement therewith, and plural spring means responsive to movement of said feedback rod in either direction to return said jet pipe to a null position following movement thereof in response to said electrical signal, the piston thereby being maintained in its adjusted position.

2. The combination of claim 1 wherein said armature assembly is operatively connected to said housing by flexure means to permit controlled movement of said armature assembly including said jet pipe.

3. The combination of claim 1 wherein said plural spring means comprises first and second springs opposed in force, with said first spring effecting return of the jet pipe to a null position when said piston moves in one direction and said second spring effecting return of the jet pipe to a null position when said piston moves in the opposite direction.

4. The combination of claim 1 wherein said feedback rod is mounted within said housing parallel to the axis of said piston, said feedback rod being operatively connected to said piston by means of a feedback arm mounted at opposite ends on said feedback rod and the rod of said piston.

5. A servo actuator comprising housing means, a cylindrical chamber formed in said housing, piston means mounted for reciprocation within said cylindrical chamber to form variable volume chambers at opposite sides of said piston, an armature assembly mounted in said housing, said armature assembly including a jet pipe mounted thereon, a pair of receiving passages in said housing adjacent the discharge end of said jet pipe for directing proportionally variable amounts of fluid under pressure to said piston chambers for controlling the position of said piston, said jet pipe when in a null position having its discharge end symmetrically located relative to said receiving passages for supplying substantially equal quantities of fluid thereto, means providing an electrical signal to bias said armature assembly for variably positioning said jet pipe to deliver disproportionate amounts of fluid to said receiving passages, a feedback rod mounted within said housing and operatively connected to said piston for movement therewith, said feedback rod being provided with a tapered end portion, first spring means for returning said jet pipe to a null position following movement of said piston in one direction, said first spring means being disposed between said armature assembly and a follower, said follower having a roller rotatably mounted thereon engageable with said tapered end portion of said rod, said first spring means being compressed by said follower upon movement of said feedback rod in said one direction to return said jet pipe to a null position, and second spring means for returning said jet pipe to a null position following movement of said piston in the opposite direction, the piston thereby being maintained in its adjusted position.

6. A servo actuator comprising housing means, a cylindrical chamber formed in said housing, piston means mounted for reciprocation within said cylindrical chamber to form variable volume chambers at opposite sides of said piston, an armature assembly mounted in said housing, said armature assembly including a jet pipe mounted thereon, a pair of receiving passages in said housing adjacent the discharge end of said jet pipe for directing proportionally variable amounts of fluid under pressure to said piston chambers for controlling the position of said piston, said jet pipe when in a null position having its discharge end symmetrically located relative to said receiving passages for supplying substantially equal quantities of fluid thereto, means providing an electrical signal to bias said armature assembly for variably positioning said jet pipe to deliver disproportionate amounts of fluid to said receiving passages, a feedback rod mounted within said housing and operatively connected to said piston for movement therewith, said feedback rod being provided with a tapered end portion, first spring means for returning said jet pipe to a null position following movement of said piston in one direction, said first spring means being disposed between said armature assembly and a follower, said follower having a roller rotatably mounted thereon engageable with said tapered end portion of said rod, said first spring means being compressed by said follower upon movement of said feedback rod in said one direction to return said jet pipe to a null position, and second spring means for returning said jet pipe to a null position following movement of said piston in the opposite direction, the piston thereby being maintained in its adjusted position, said second spring means being disposed between said armature assembly and a portion of said housing, tension being created in said second spring means upon movement of said armature assembly in response to a signal causing movement of said piston in said opposite direction to return said jet pipe to a null position.

7. The combination of claim 6 further comprising means for adjusting the tension in said second spring.

8. A servo actuator comprising housing means, a cylindrical chamber formed in said housing, piston means mounted for reciprocation within said cylindrical chamber to form variable volume chambers at opposite sides of said piston, an armature assembly flexibly mounted in said housing, said armature assembly including a support plate and an armature and a jet pipe mounted on said support plate, a pair of receiving passages in said housing adjacent the discharge end of said jet pipe for directing proportionally variable amounts of fluid under pressure to said piston chambers for controlling the position of said piston, said jet pipe when in a null position having its discharge end symmetrically located relative to said receiving passages for supplying substantially equal quantities of fluid thereto, means providing an electrical signal to bias said armature and thus said jet pipe for variably positioning said jet pipe to deliver disproportionate amounts of fluid to said receiving passages, a feedback rod mounted within said housing and operatively connected to said piston for movement therewith, said feedback rod being provided with a tapered end portion, and plural spring means responsive to movement of said feedback rod in either direction to return said jet pipe to a null position following movement thereof in response to said electrical signal, the piston thereby being maintained in its adjusted position, said plural spring means comprising a first spring disposed between said support plate and a follower, said follower having a roller mounted thereon biased into continual engagement with said tapered end portion of said feedback rod by said first spring, said first spring being compressed by said follower upon movement of said feedback rod in one direction to return said jet pipe to a null position.

9. The combination of claim 8 wherein said plural spring means further comprises a second spring disposed between said support plate and a portion of said housing, said second spring upon movement of said support plate in response to a signal causing movement of said piston in an opposite direction being effective to return said jet pipe to a null position.

10. A servo actuator comprising housing means, a cylindrical chamber formed in said housing, piston means mounted for reciprocation within said cylindrical chamber to form variable volume chambers at opposite sides of said piston, an armature assembly mounted in said housing, said armature assembly including a jet pipe mounted thereon, a pair of receiving passages in said housing adjacent the discharge end of said jet pipe for directing proportionally variable amounts of fluid under pressure to said piston chambers for controlling the position of said piston, said jet pipe when in a null position having its discharge end symmetrically located relative to said receiving passages for supplying substantially equal quantities of fluid thereto, means providing an electrical signal to bias said armature assembly for variably positioning said jet pipe to deliver disproportionate amounts of fluid to said receiving passages, a feedback rod mounted within said housing and operatively connected to said piston for movement therewith, one end of said feedback rod being adjacent said armature assembly and varying in diameter, first spring means mounted on said armature assembly and resiliently engaging means contacting the varying diameter end of said rod, the longitudinal movement of said rod in one direction acting through said first spring means to return said jet pipe to a null position, and second spring means operatively connected to said armature assembly for returning said jet pipe to a null position following movement of said piston in the opposite direction, the piston thereby being maintained in its adjusted position.

References Cited
UNITED STATES PATENTS

| | | | |
|---|---|---|---|
| 1,515,173 | 11/1924 | Rouka | 91—387 |
| 2,241,330 | 5/1941 | Shaw | 91—3 |
| 2,827,020 | 3/1958 | Cook | 91—3 |
| 2,996,072 | 8/1961 | Atchley | 137—82 |
| 3,222,996 | 12/1965 | Thieme et al. | 91—387 |

FOREIGN PATENTS

| | | |
|---|---|---|
| 646,571 | 7/1928 | France. |

MARTIN P. SCHWADRON, *Primary Examiner.*

PAUL E. MASLOUSKY, *Examiner.*